United States Patent [19]

Jang

[11] Patent Number: 5,221,199
[45] Date of Patent: Jun. 22, 1993

[54] LUBRICATION OIL VOLUME CONTROL DEVICE IN A SCROLL TYPE COMPRESSOR

[75] Inventor: Sung P. Jang, Seoul, Rep. of Korea

[73] Assignee: Samsung Electronics Co., Ltd., Suweon, Rep. of Korea

[21] Appl. No.: 760,126

[22] Filed: Sep. 16, 1991

[30] Foreign Application Priority Data

Sep. 18, 1990 [KR] Rep. of Korea ........... U.M.90-14320

[51] Int. Cl.$^5$ .................. F04C 18/04; F04C 29/02; F01M 1/06; G05D 13/10
[52] U.S. Cl. .................... 418/55.6; 418/84; 418/87; 418/94; 137/56; 184/6.18
[58] Field of Search .............. 418/55.6, 84, 87, 94; 184/6.18; 137/56

[56] References Cited

U.S. PATENT DOCUMENTS 4,343,599 8/1982 Kousokabe .................. 418/55.6

FOREIGN PATENT DOCUMENTS

| | | | |
|---|---|---|---|
| 62-282183 | 5/1986 | Japan . | |
| 61-187592 | 8/1986 | Japan | 418/87 |
| 63-32189 | 2/1988 | Japan | 418/84 |
| 1-219383 | 9/1989 | Japan | 418/55.6 |

*Primary Examiner*—John J. Vrablik
*Attorney, Agent, or Firm*—Burns, Doane, Swecker & Mathis

[57] ABSTRACT

A scroll compressor includes a stationary scroll and a rotary scroll rotated by a motor-driven crankshaft. The crankshaft has parallel passages therein which communicate at their lower ends with a pool of lubricating oil. A first of the passages coincides generally with the axis of rotation of the crankshaft at an inclination thereto, and a second of the passages is eccentrically offset. The crankshaft drives a pump which creates a suction in the passages to conduct oil from the pool to the scrolls. A control member is connected to the crankshaft for rotation therewith and is responsive to centrifugal force for gradually closing the second passage as the crankshaft speed exceeds a predetermined value. The amount of oil which is conducted is thus proportional to the crankshaft speed.

7 Claims, 3 Drawing Sheets

LUBRICATION OIL VOLUME CONTROL DEVICE IN A SCROLL TYPE COMPRESSOR

BACKGROUND OF INVENTION

Field of the Invention

The invention is related to a lubrication oil volume control device for use in a scroll compressor, and more particularly to a lubrication oil volume control device which is able to properly control the lubrication oil volume in accordance with a change in the angular speed (rpm) of the crankshaft in the scroll type compressor.

Scroll type compressors are used in household appliances such as a refrigerator and the like, since a conventional reciprocating type compressor generates a noise by its piston movement and occupies more volume than a scroll type compressor.

A conventional scroll type compressor is provided with a cylindrical chamber. An oil reservoir is formed in a bottom portion of the chamber which stores the lubrication oil. A power converting means is positioned above the oil reservoir for allowing the crankshaft to be rotated by a rotor and a stator enclosing the rotor. A compressing portion having a fixed scroll member and an orbiting scroll member is located at an upper portion of the chamber, for sucking lubricating oil through a suction passage installed at a bottom part of the crankshaft and supplying it to the compressing portion where it is needed.

However, the prior art device has a problem in that poor operation of the compressor occurs due to an excessive or insufficient oil volume which results from a volume control failure.

In order to prevent such problem, Japanese Patent Laid-Open No. 282183/1987 discloses a lubricator for a compressor. The lubricator can feed a sufficient quantity of lubricant even at the start-up or during low speed rotation of the compressor by fixing a pump rotor to the lower end of the main shaft to perform a centrifugal pumping action to an eccentric lubrication hole. The lower end section of the main shaft is surrounded by a pumping housing. A suction pipe is positioned on the bottom of the pumping housing. The pump rotor has a pressure feed groove and a through hole housing. Sealing members are provided respectively between the pump rotor and the pump housing and the supply pipe.

However, the lubricator in this invention is susceptible to leakage due to aging of the sealing member caused by time and by the chemical properties of oil and by other aging factors.

SUMMARY OF THE INVENTION

An object of the present invention is to provide a lubrication oil volume control device for solving the above problems.

Another object of the present invention is to provide a lubrication oil volume control device which is able to supply the proper volume of lubrication oil in proportion to a change in the rotational speed of the crankshaft.

Another object of the present invention is to provide a lubrication oil volume control device which does not leak after an extended period of operation.

In accordance with a preferred embodiment the present invention, the lubrication oil volume control device comprises a main suction port which extends from an oil pool toward a pumping means along a center line of a crankshaft. A secondary suction port extends from the oil pool toward the pumping means, and is spaced in a parallel manner away from the main suction port at a predetermined distance. A control means is installed in a lower portion of the main suction port, for closing the secondary suction port in response to centrifugal force generated in direct proportion to the rotation speed of the crankshaft, whereby the main suction port and the secondary suction port are open when the rotational velocity of the crankshaft is in a stationary through a lower velocity state, and the secondary suction port is closed when the rotational velocity of the crankshaft is in a high velocity state. Thus, a volume of lubrication oil is supplied in proportion to the rotational velocity of the crankshaft.

The control means comprises a cap which is coupled to a lower portion of the crankshaft for supplying oil to the main suction port and the secondary suction port. A controller mounted in the cap closes the secondary suction port when the rotational velocity of the crankshaft enters a predetermined range. A groove (guide portion) is provided on the cap for moving the controller to open and close the secondary suction port. A first elastic means which is made of a metal is set the cap, and supports one end of the controller. A second elastic means which is made of a metal is set in the cap, and supports the other end of the controller against an expansion force of the first elastic means.

As a result of the above structure, when the compressor is in a stationary state the controller is placed in a position at which an expansion force of the first elastic means is equal to that of the second elastic means. That is, a position at which both the main suction port and the secondary suction port are open.

In the beginning state of operating the compressor, the second elastic means compresses the controller thereby partially closing the secondary suction means by the centrifugal force generated with the rotation of the crankshaft.

Further, as the rotational velocity of the crankshaft gradually increases and enters a predetermined range of high velocity, the controller closes the secondary suction port.

Therefore, when at low velocity of the crankshaft, lubrication oil is fed sufficiently to the place where the oil is needed through both the main section port and the secondary suction port. When the rotational velocity of the crankshaft is above a predetermined rotational velocity, the proper volume of lubrication oil is fed through only the main suction port.

BRIEF DESCRIPTION OF DRAWINGS

The invention will be explained in detail below by reference to the accompanying drawings, in which.

DETAILED DESCRIPTION OF THE INVENTION

Figure 1:
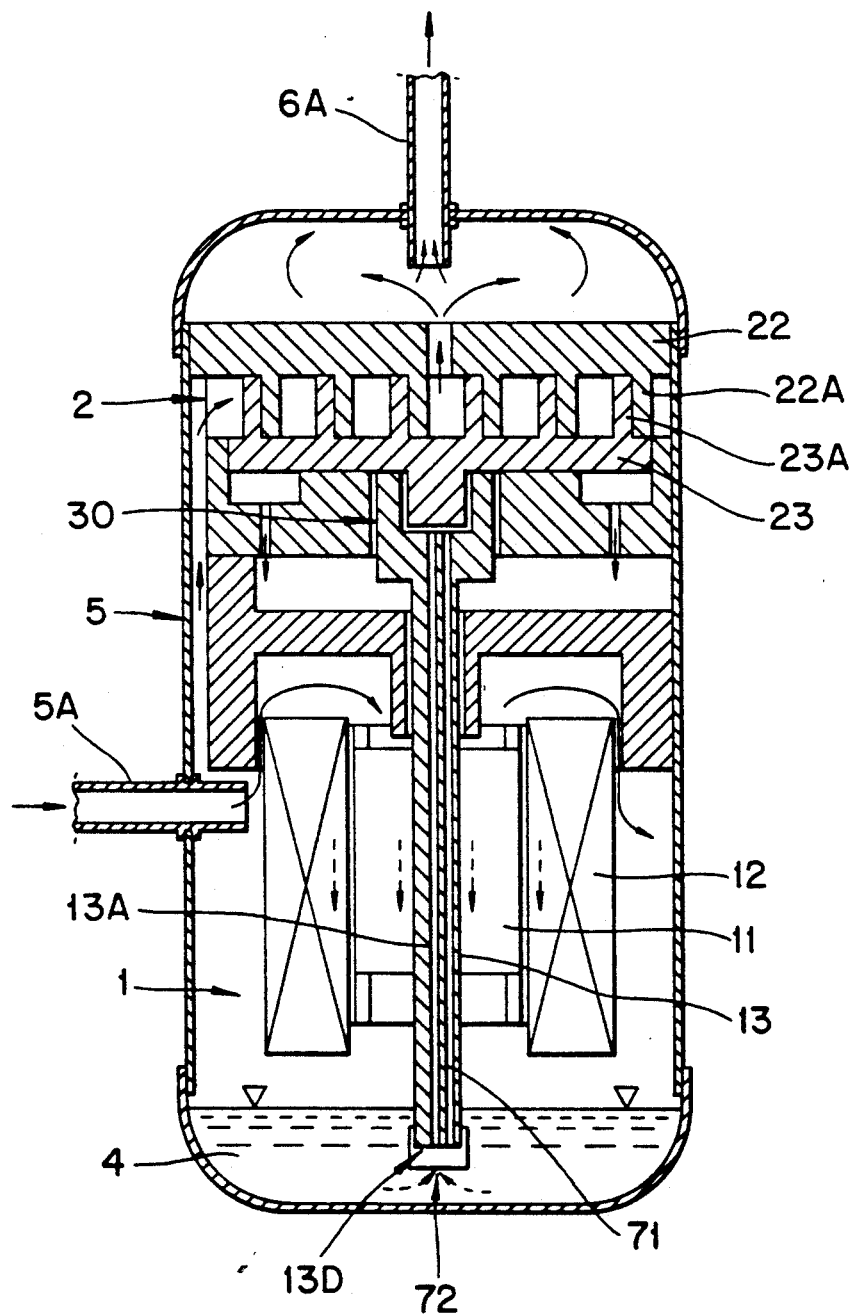
FIG. 1 is a vertical cross sectional view of the lubrication oil volume control device of the present invention in a scroll type compressor.

FIG. 1 illustrates a scroll type compressor according to the present invention positioned in a cylindrical chamber 5. The compressor comprises an oil reservoir 4 in the bottom portion of the chamber 5 for storing a pool of lubrication oil. A lubrication volume regulating device which includes a crankshaft 13 is located above the oil pool 4, and is formed integrally with a rotor 11 of an electric drive. The volume regulating device has a main suction port 13A and a secondary suction port 71 formed therein. A control means 72 is installed at a lower terminal end 13D of the crankshaft 13. A power converting means 1 which rotates the crankshaft 13 includes the rotor 11 and a stator 12 enclosing the rotor 11. A compressing portion 2 has a fixed scroll member 22 and an orbiting scroll member 23 at the upper portion of the chamber 5 with engagement securing between the wrap 22A of the fixed scroll member 22 and the wrap 23A of the orbiting scroll member 23. Thus during operation a predetermined medium is taken into the chamber 5 through suction tube 5A and pressurized and released through discharge tube 6A formed at a dome of the chamber 5.

Figure 2:
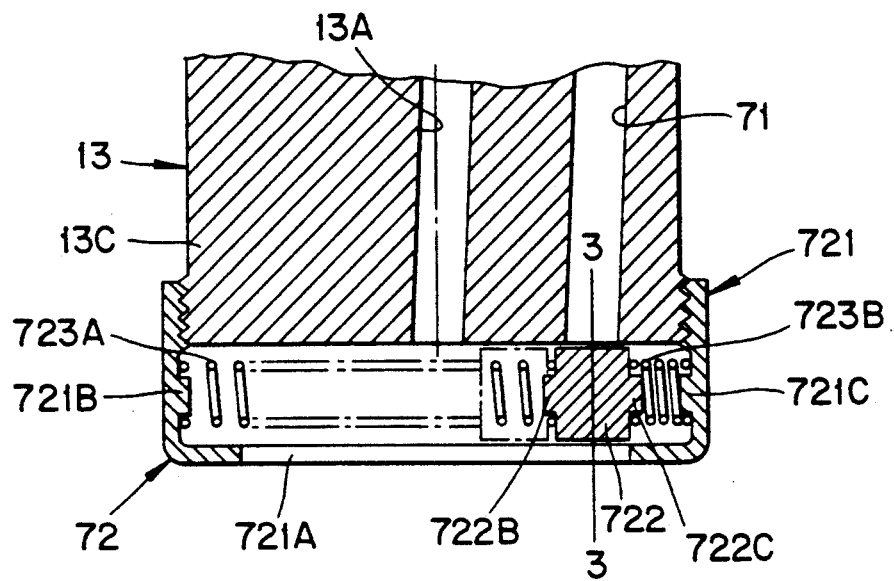
FIG. 2 is an enlarged sectional view of the lubrication oil volume control means and the main suction port and the secondary suction port of the present invention.

The lubrication oil volume control device of the present invention in FIG. 2 comprises the control means 72, the main suction port 13A, and the secondary suction port 71. In this embodiment the main suction port 13A and the secondary suction port 71 are formed in the crankshaft 13 as cylinder shaped bores. The main suction port 13A is formed generally along a centerline of the crankshaft 13 at an inclination thereto (see FIG. 2) and the secondary suction port 71 is formed eccentrically at an outward portion of the crankshaft 13 with the centerline of the secondary suction port 71 being parallel and spaced apart from the centerline of the main suction port 13A at a predetermined distance. Furthermore, external threads 13C are formed at the terminal end 13D of the crankshaft 13 for threadably engaging the control means 72. Oil within the reservoir 4 is sucked upwardly through suction ports 13A, 71 by a difference in pressure between the upper and lower ends of the shaft 13 and centrifugal force produced on the eccentric port 71 by the rotation of shaft 13.

The control means 72 comprises a cap 721 with a bottom plate which has an oblong supply opening 721A therein through which oil flows from the oil pool 4. On the inner wall of the cap 721 a pair of seats 721B,721C are formed to support a first elastic means 723A and a second elastic means 723B, respectively. The control means 72 provides a controller 722 for closing the secondary suction port 71 on the upper surface of the bottom plate of the control means 72. Any shape of the controller 722 is acceptable which has an upper area which can close the secondary suction port 71. In this embodiment the controller 722 is somewhat cubic in shape. One end of the controller 722, that is, one surface of the controller 722 which faces against the face of the seat 721B, is provided with a seat 722B which has the same configuration as that of the seat 721B. Also, the other end of the controller 722, that is, the surface of the controller 722 which faces against the face of the seat 721C, is provided with a seat 722C which has the same configuration as that of the seat 721C. The first elastic means 723A is installed between the seat 721B and the seat 722B. The second elastic means 723B is installed between the seat 721C and the seat 722C. Therefore, the controller 722 is acted upon by the springs to be normally positioned between the main suction port 13A and the secondary suction port 71 as shown with a two dot chain line in FIG. 2. In this embodiment the first and second elastic means 723A,723B are coil springs. Further, in this embodiment the first spring 723A is a single spring. However, a plurality of springs can be installed with a plurality of seats around the seat 721B and the 722B. The same type of construction can be used for the second spring 723B.

Figure 3:
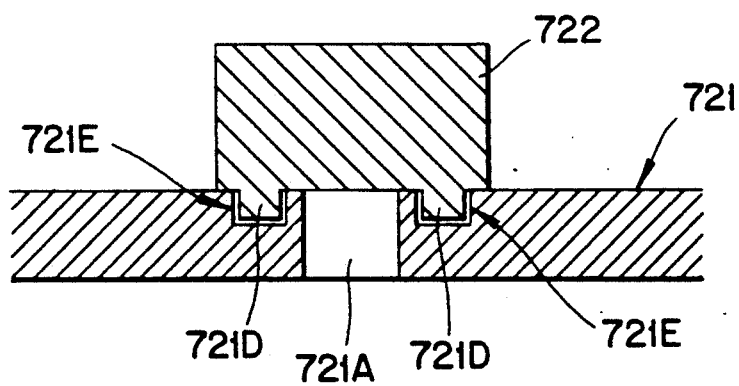
FIG. 3 is a cross sectional view of the controller taken along the line 3—3 of FIG. 2.

As shown in FIG. 3, a pair of parallel legs 721D are formed on the bottom surface of the controller 722 along the longitudinal line of the supply opening 721A. The legs 721D enable linear movement of the controller 722 along respective grooves 721E which are formed on the bottom plate of the cap 721. The span of the groove 721E can limit a range of travel of the controller 722.

The lubricating oil volume regulating device in the present invention operates as follows, with reference to FIGS. 4 and 5.

Figure 4:
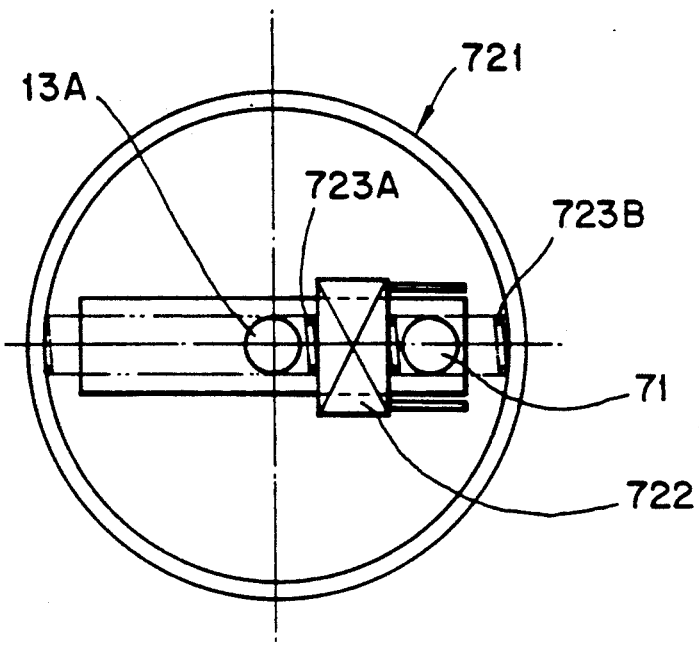
FIG. 4 is a horizontal sectional view of the lubrication oil volume control device illustrating the controller in a stationary state or a low velocity state.

FIG. 4 illustrates a position of the controller 722 where the crankshaft is in a stationary state or a state of low velocity. In that state both the main suction port 13A and the secondary suction port 71 are open. Through the main suction port 13A and the secondary suction port 71, the proper volume of oil is fed from the oil pool 4 toward a pumping means 30; the place where lubrication oil is needed under compression of the chamber 5. Upon a steady increase of rotational velocity, the first spring 723A is extended by centrifugal force, and the second spring 723B is compressed by the same force. Hence, the controller 722 moves gradually toward the secondary suction port 71.

Figure 5:
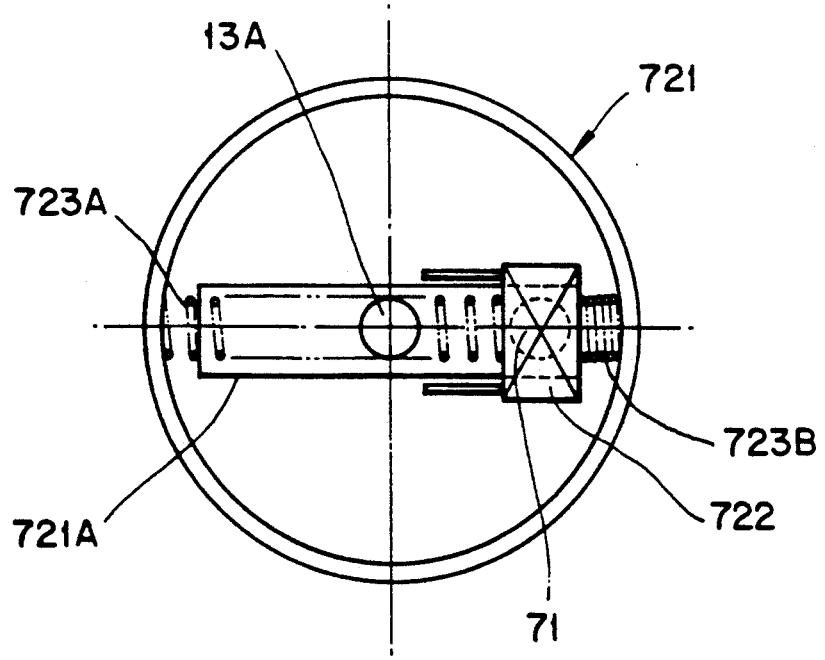
FIG. 5 is a horizontal sectional view of the lubrication oil volume control device illustrating the controller in a high velocity state.

FIG. 5 illustrates the position of the controller 722 where the crankshaft 13 is in a state of high velocity. In that state the secondary suction port 71 is closed. Through the main suction port 13A only is the proper volume of oil fed from the oil pool 4 toward the pumping means 30.

With the above described operation of the present invention, the lubricating oil volume regulating device solves the problem resulting from either excessive volume or insufficient volume of lubricating oil, particularly from the excessive feeding of lubricating oil. Furthermore, the control device of the present invention operates economically, efficiently, reliably and most importantly, automatically.

What is claimed is:

1. A scroll compressor for compressing a fluid, comprising:
   a housing forming an internal chamber;
   a pool of lubricating oil disposed in said chamber;
   a crankshaft rotatably mounted in said chamber and having suction passage means formed therein, with a lower end of said suction passage means communicating with said oil pool;
   a movable scroll member driven by an upper end of said crankshaft;
   a fixed scroll member disposed in mating relationship with said movable scroll member;
   motor means for rotating said crankshaft and moving said movable scroll member to compress the fluid, and to develop a suction in said suction passage means such that said suction passage means conducts oil from said pool to said scroll members;

a cap attached to a lower end of said crankshaft; and a movable controller member mounted to said cap beneath said crankshaft and being movable by centrifugal force produced by said crankshaft for gradually obstructing said suction passage means in response to increasing rotary speed of said crankshaft to reduce the amount of oil conducted to said scroll members.

2. A scroll compressor according to claim 1, wherein said cap is removably attached to said crankshaft.

3. A scroll compressor according to claim 2, wherein said cap is threadedly connected to said crankshaft.

4. A scroll compressor according to claim 1, wherein said cap forms a space beneath said crankshaft in which said controller member is mounted for reciprocation.

5. A scroll compressor for compressing a fluid, comprising:

a housing forming an internal chamber;

a pool of lubricating oil disposed in said chamber;

a crankshaft rotatably mounted in said chamber and having suction passage means formed therein, with a lower end of said suction passage means communicating with said oil pool, said suction passage means comprising a first suction passage coinciding generally with an axis of rotation of said crankshaft after inclination thereto, and a second inclined suction passage arranged eccentrically to said first suction passage, a movable scroll member driven by an upper end of said crankshaft;

a fixed scroll member disposed in mating relationship with said movable scroll member;

motor means for rotating said crankshaft and moving said movable scroll member to compress the fluid and to develop a suction in said first and second suction passages such that said first and second suction passages conduct oil from said pool to said scroll members; and control means for reducing the amount of oil conducted to said scroll members as the rotary speed of said crankshaft increases, comprising:

a cap threadedly connected to a lower end of said crankshaft, said cap forming a space beneath said crankshaft, said space communicating said oil pool with said first and second suction passages, a controller member mounted in said space and arranged to rotate with said crankshaft and to be displaced radially by centrifugal force produced thereby, said controller member biased to a neutral position radially between said first and second suction passages and arranged to be displaced gradually toward said second passage in response to centrifugal force as the rotary speed of said crankshaft increases, for reducing the amount of oil conducted to said scroll members, and yieldable spring means for biasing said controller member to said neutral position.

6. A scroll compressor according to claim 5, wherein said spring means includes first and second spring means disposed on opposite sides of said controller member for biasing said controller member in opposite directions.

7. A scroll compressor according to claim 6, wherein each of said first and second spring means is a coil spring.

* * * * *